E. H. NYLIN.
ATTACHMENT FOR HAND TRUCKS.
APPLICATION FILED MAY 24, 1920.

1,358,235.

Patented Nov. 9, 1920.

INVENTOR
Erik H. Nylin
BY
Fred C. Matheny
ATTORNEY

UNITED STATES PATENT OFFICE.

ERIK H. NYLIN, OF SEATTLE, WASHINGTON.

ATTACHMENT FOR HAND-TRUCKS.

1,358,235.  Specification of Letters Patent.  Patented Nov. 9, 1920.

Application filed May 24, 1920. Serial No. 383,792.

*To all whom it may concern:*

Be it known that I, ERIK H. NYLIN, a citizen of the United States, residing at Seattle, in the county of King and State of Washington, have invented certain new and useful Improvements in Attachments for Hand-Trucks, of which the following is a specification.

My invention relates to improvements in attachments for hand trucks and the object of my improvement is to provide an attachment of simple and efficient construction that may be installed on any ordinary form of hand truck and that is adapted for supporting that portion of the weight of the truck and its load that is ordinarily supported by the truck operator that grasps the handles of the truck when wheeling the same.

A further object is to provide an attachment of this nature that is not expensive to construct, that is easy to install on hand trucks of the type now in common use and one that will not be in the way or interfere in any way with the normal use of the truck.

The invention consists in the novel construction adaptation and combination of parts of an attachment for hand trucks as will be more clearly hereinafter described and claimed.

Figure 1:
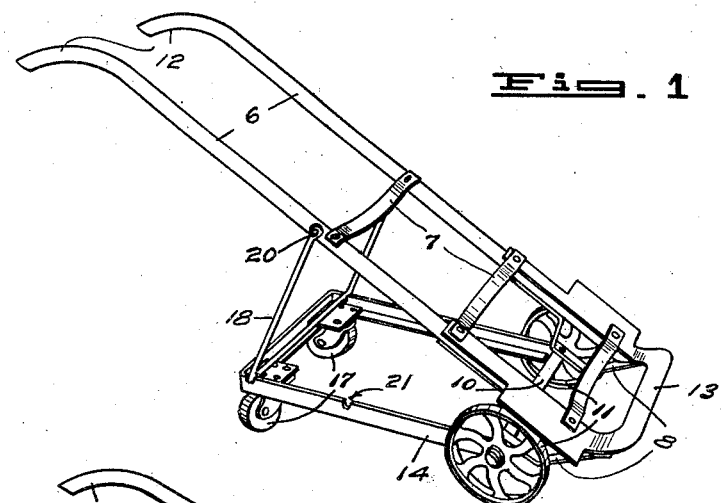
Figure 2:
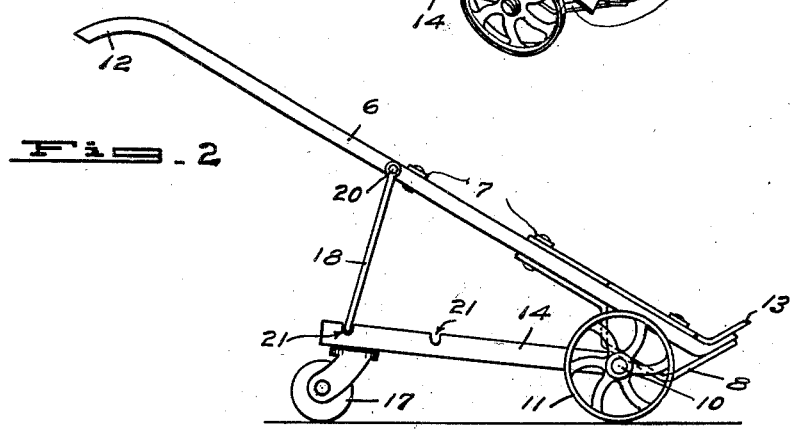
Figure 3:
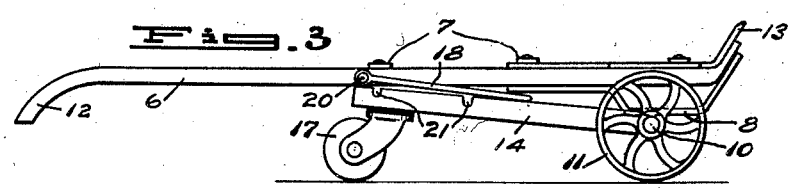
Figure 4:
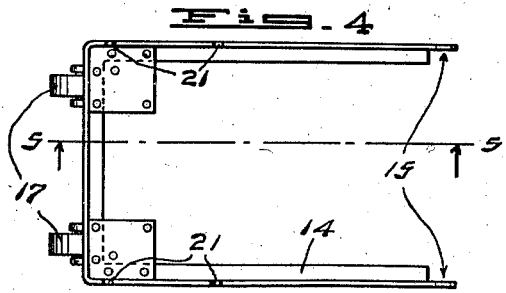
Figure 5:
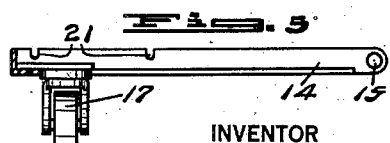

In the accompanying drawings Figure 1 is a view in perspective of a hand truck on which my weight supporting attachment is installed; Figs. 2 and 3 are views in side elevation of the same showing an operative and a folded position respectively; Fig. 4 is a detached plan view of the frame of the attachment and Fig. 5 is a view partly in section and partly in elevation on broken line 5, 5 of Fig. 4.

Like reference numerals designate like parts throughout the several views.

Referring to the drawings I have shown a common form of hand truck comprising side members 6 connected by cross bars 7 and provided near their forward end with brackets 8 that are secured to a transverse axle 10 upon the ends of which are journaled wheels 11. The side members 6 terminate at their rear ends in curved handle elements 12 and are provided at their forward ends with the usual nose piece 13.

The attachment comprises a U shaped frame member 14 preferably of angle iron that is provided at its forward end and in each side thereof with perforations 15 that are adapted to fit over the axle 10 of the truck to secure the frame 14 to the truck.

The rear end of the frame 14 is provided at each corner with a caster wheel 17 that supports the rear end of such frame for movement.

The side members 6 are supported in the operative position shown in Fig. 2 by a U shaped support 18 that has its two upper ends hinged to the members 6 by pivots 20 and that is adapted to have its lower end rest within notches 21 in the upper edge of the frame 14. The notches 21 are arranged in transverse alinemnt on the two sides of the frame and if desired a plurality of such notches may be provided for the purpose of giving an adjustment as to height.

The rear end of the frame 14 is preferably high enough so that it will support the truck frame in a substantially horizontal position, when the supporting member 18 is folded as shown in Fig. 1, thereby permitting the feet or legs that are usually found near the handle end of a truck frame to be dispensed with.

The attachment may be applied to any ordinary hand truck by removing the truck wheels, slipping the perforated forward ends of the attachment frame 14 over the axles, then replacing the wheels. The two sides of the frame 14 will spring apart sufficiently to permit them to be slipped over the ends of the truck axle.

The support 18 may swing freely on the pivots 20 or it may be held by friction sufficiently tight so that when it is lifted out of the notches 21 it will ordinarily not move and will drop back into the same notches when the truck handles are lowered.

If desired an auxiliary caster wheel similar to the wheels 17 may be secured to the center of the rear cross bar or end of the rectangular frame 14 and allowed to project upwardly from said frame or in an opposite direction from the wheels 17 so that the frame 14 may be turned over or reversed and allowed to project outwardly in front of the truck, in which position it will be supported on the auxiliary caster wheel and will serve as an extension in front of the truck for supporting bulky loads.

While this device is especially well adapted for use as an attachment for trucks of standard type it will be understood that the same may be incorporated into the construction of new trucks if desired, The attachment is especially advantageous on trucks that are used for wheeling heavy loads and serves to relieve the truck operator of the strain of supporting the handles while he is wheeling the truck.

The caster wheels 17 turn readily in every direction so that the truck with the attachment thereon is easy to guide and handle either when it is loaded or not loaded.

Obviously the front ends of the frame 14 may be pivotally attached in various ways to the front end of the truck instead of being connected with the axle as described.

From the foregoing description taken in connection with the accompanying drawings the advantages of the construction and of the method of operation of my weight supporting attachment for hand trucks will be readily apparent, but, while I have described the principle of operation of the invention together with the device which I now consider to be the best embodiment thereof it will be understood that the device shown is merely illustrative and that such changes may be resorted to as are within the scope of the following claim.

What I claim is:

An attachment for hand trucks comprising a frame of rectangular shape arranged to be pivotally secured to a truck adjacent the axle thereof, caster wheels secured to the rear of said frame for supporting the same, and a U shaped supporting bracket pivotally secured at its open end to the side members of the truck and arranged to rest on said frame, said frame having notches for the reception of the lower end of said supporting bracket.

Signed at Seattle, Washington, this 10th day of May, 1920.

ERIK H. NYLIN.